United States Patent Office 3,488,325
Patented Jan. 6, 1970

---

3,488,325
PROMOTERS FOR THE ANIONIC POLYMERIZATION OF LACTAMS
Edward W. Pietrusza, Morristown, and Jack R. Pedersen, Parsippany, N.J., assignors to Allied Chemical Corporation, New York, N.Y., a corporation of New York
No Drawing. Filed July 21, 1967, Ser. No. 655,000
Int. Cl. C08g 20/18, 20/12
U.S. Cl. 260—78       9 Claims

ABSTRACT OF THE DISCLOSURE

This specification discloses an improved process for the anionic polymerization of lactams such as ε-caprolactam whereby a 2-(substituted-carbonylthio)benzothiazole compound is added to the monomer mixture as cocatalyst promoter. These cocatalysts effect the polymerization of lactams to high molecular weight polymers rapidly at temperatures below the polymer melting point, thereby permitting the preparation of shaped articles of polyamides, such as polycaproamide (nylon 6), directly from the lactam monomer in situ in a mold.

---

The anionic polymerization of lactams whereby a lactam is polymerized in the presence of an anionic catalyst is well known. This polymerization has advantages over the more conventional hydrolytic polymerization in that large quantities of diluent are not required. Moreover, the anionic polymerization produces high molecular weight polymer much more rapidly than does the hydrolytic process, on the order of minutes as against many hours to attain similar molecular weights. However, temperatures of polymerization above the polymer melting point are required to initiate the polymerization. These high temperatures promote rapid polymerization to high molecular weights, but since the equilibrium between monomer and polymer is temperature dependent and high polymerization temperatures result in lowered conversion of monomer to polymer, large quantities of monomer may be present in the anionically polymerized polymer. Since a high monomer content will adversely affect polymer properties, a purification step is generally required to remove the monomer. Thus, low polymerization temperatures are desirable to increase the conversion of monomer to polymer. Temperatures of polymerization below the polymer melting point are also desirable when molded articles are to be prepared, since the lactam can be polymerized directly in the mold which can be of large or intricate design, and solid articles shaped to conform to the mold can be prepared without further processing or machining.

Various cocatalyst promoters have been disclosed in the prior art to increase the rate of polymerization of lactams to high molecular weight polymer at temperatures below the polymer melting point, but the need for new promoters continues.

It is a principal object of the present invention to provide novel cocatalyst promoters for the anionic polymerization of lactams.

It is another object to provide novel compounds useful as cocatalyst promoters for the anionic polymerization of lactams.

It is a further object to provide cocatalyst promoters which make possible the conversion of lactams to high molecular weight polyamides rapidly at temperatures below the polymer melting point.

It is another object to provide an improved process for the polymerization of lactams at temperatures below the polymer melting point.

Further objects will become apparent from the following detailed description thereof.

We have discovered novel cocatalyst promoters for the anionic polymerization of lactams to very high molecular weights rapidly, i.e. in a few minutes, at temperatures well below the polymer melting points. These novel cocatalysts comprise benzothiazole derivatives having the formula

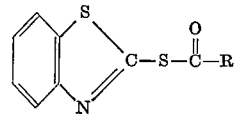

wherein R is an alkyl, aryl, alkaryl, aralkyl, alkoxy, or aryloxy radical.

These compounds can be prepared by the method disclosed by K. N. Ayad et al., J. Chem. Soc., 1962, p. 2070, whereby equimolar amounts of the sodium salt of 2-mercaptobenzothiazole and a compound containing a carbonyl chloride end group are reacted in a solvent such as an alcohol or acetone.

Alternatively the compounds as above described can be prepared by condensation of 2-mercaptobenzothiazole with a compound containing a carbonyl chloride end group in a relatively high boiling solvent in accordance with the following equation:

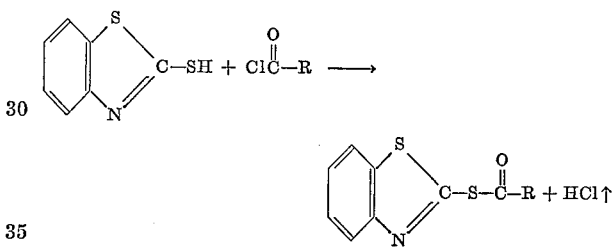

Typically equimolar amounts of the reactants are dissolved in a common solvent and heated at a temperature from about 50° C. up to the reflux temperature of the solution until the evolution of hydrogen chloride ceases. Preferably the reaction is carried out under anhydrous conditions.

The solvent must be inert to the reaction and be a solvent for the reactants. Preferably it will be a solvent for the product as well although this is not required. Suitable solvents include aromatic hydrocarbons such as benzene, toluene, xylene, ethylbenzene, m-diisopropylbenzene, and the like.

The product can be recovered in conventional manner, as by removal of the solvent or precipitation of the product by addition of a nonsolvent. The product can be further purified by recrystallization from a suitable solvent or by fractional distillation as will be known to one skilled in the art.

The cocatalyst promoters described above are effective for the polymerization of lactams having from 6 to 12 carbon atoms in the lactam ring. Suitable lactams include ε-caprolactam, enantholactam, caprylolactam, laurolactam, and the like. These lactams can be homopolymerized or copolymerized with each other.

The anionic catalyst for the polymerization of the lactam is conventional and comprises a metal salt of the lactam. These known anionic catalysts can be prepared by heating an alkali metal, an alkaline earth metal, or a basically reacting compound of such metals including their hydrides, amides, oxides, hydroxides, carbonates, salts of weak acids, metallo-organic compounds, and the like, with excess lactam. The salt-forming metal or metallic compound is admixed with the molten lactam under anhydrous conditions to form a reactive mixture containing from about 0.1 to about 5, preferably from about 0.4 to about 2.0, mols of the metal per 100 mols of lactam.

The temperature is maintained above the melting point of the lactam during this step.

The addition of one of the above-described cocatalysts to the lactam-lactam salt reaction mixture results in the rapid polymerization of the lactam to the corresponding polyamide. In general, from about 0.1 to about 10 mols of cocatalyst is required for each mol of anionic catalyst present. Since the molecular weight of the polymer decreases as the amount of cocatalyst increases, relatively small amounts, on the order of 0.05 to 1.5 mols per 100 mols of lactam, will be employed when high molecular weight polymer is desired. For example, polycaprolactam having high molecular weight, equivalent to reduced viscosities as a 0.5 percent by weight solution in m-cresol at 25° C. of from about 4 to 12, can readily be obtained using from about 0.7 to 1.4 mols of anionic catalyst and from about 0.2 to 0.7 mol of cocatalyst per 100 mols of ε-caprolactam.

The temperature of polymerization can be from the melting point of the lactam monomer up to the decomposition temperature of the polymer. However, temperatures above the melting point of the monomer but below the flow point of the resultant polyamide are particularly suitable for the preparation of molded articles and are preferred according to the present invention. A suitable polymerization temperature for preparing molded articles from ε-caprolactam for example is from about 110° C. to about 215° C., the preferred range according to the process of the invention being from about 150° C. to about 180° C.

It is necessary that the polymerization process as disclosed herein be conducted under substantially anhydrous, nonacidic conditions. Those compounds which are capable of acting as proton donors are to be excluded from the reaction mixture inasmuch as these compounds readily interact with and decompose the lactam-salt species in the reaction mixture. The presence of a proton-donating species, particularly water, should be kept below about 50 p.p.m.

The polymerization process is preferably conducted by adding a cocatalyst promoter of the invention to a reaction mixture containing the desired lactam and a metal salt of the lactam, but a reverse procedure can be utilized if desired; i.e. the cocatalyst can be added to the lactam and the alkali metal or alkaline earth metal or salt-forming compound thereof can be added thereafter. Alternatively, if desired, it is possible to add a cocatalyst promoter of the invention simultaneously with the anionic catalyst to the lactam.

The metal salt of the lactam is preferably prepared in situ immediately prior to its utilization in the polymerization process to minimize risk of contamination. However, a mixture of said metal salt of the lactam and the lactam, particularly when the lactam is ε-caprolactam, is stable at room temperature for a month or more, and even at higher temperatures, up to about 90° C., the solution is stable for several days. Accordingly, the salt can be prepared in advance and stored if desired.

By utilization of a cocatalyst of the invention in conjunction with an anionic catalyst, there is obtained a rapid rate of polymerization as well as a high rate of conversion to polymer when temperatures of polymerization below the melting point of the polymer are employed. This eliminates the necessity of removing monomer from the polymer.

Moreover, in accordance with the process of the invention, polycaproamide can be obtained having reduced viscosities as a 0.5 percent solution in m-cresol at 25° C. of at least 4, corresponding to molecular weights considerably higher than those usually achieved by conventional hydrolytic polymerization processes. Such high molecular weight polymers possess greater tensile strength and toughness than polymers of lower molecular weights, corresponding to reduced viscosities of from about 1 to 2.5, which are generally obtained by conventional processes.

In addition, the polymerization of relatively fluid monomer to solid polymer in our process allows polymerization of ε-caprolactam directly in molds including molds of intricate design to form finished solid shaped articles.

A further advantage is that various filler materials, such as sand, pigments, blowing agents, glass or asbestos fibers, low-density fillers, heat and light stabilizers, and the like, nucleating agents such as boron-nitride, magnesium silicate, etc., and plasticizers if desired, can be incorporated in the polymer readily and conveniently by admixing with the monomeric lactam, in a homogeneous manner or otherwise, just prior to polymerization.

The invention can be illustrated further by the following examples, but it is to be understood that the invention is not meant to be limited to the details described therein.

In the examples, all parts are by weight unless otherwise noted. The reduced viscosity was determined as a 0.5 percent by weight solution in m-cresol at 25° C.

EXAMPLE 1

334 parts of 2-mercaptobenzothiazole and 216 parts of ethyl chloroformate were added to 2000 parts by volume of xylene and the mixture heated at reflux for six hours. The resultant solution was fractionally distilled at reduced pressure. A product distilling at 166–170° C. at 1–1.5 mm. mercury pressure was collected as a bright yellow liquid which crystallized on cooling to a bright yellow solid. The product was recrystallized four times from n-heptane to prepare a white crystalline product having a melting point of 67–67.5° C. Elemental analysis was as follows: Calculated for $C_{10}H_9S_2NO_2$: C, 50.2; H, 3.8; N, 5.2. Found: C, 5.10; H, 3.7; N, 6.4.

The structure of the product, 2-(ethyloxycarbonylthio)-benzothiazole

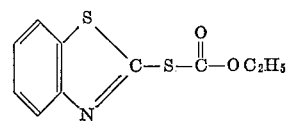

was confirmed by infrared analysis.

200 parts of ε-caprolactam and 1.4 parts of lithium hydride were charged to a tube fitted with a nitrogen inlet and outlet and placed in a heating block maintained at 160° C. When all evolution of hydrogen had ceased, 1.25 parts of 2-(ethyloxycarbonylthio)benzothiazole as prepared above were added. The mixture became viscous after two minutes and solidified after five minutes. The polymer was heated at 160° C. for an additional fifteen minutes.

The resultant off-white, hard, tough polymer had a reduced viscosity of 12.4.

EXAMPLE 2

170 parts of 2-mercaptobenzothiazole and 210 parts of benzoyl chloride were added to 500 parts by volume of xylene and heated at reflux for twenty hours under nitrogen. The solution was cooled in an ice bath and a brown solid was collected by filtration. The product was recrystallized from n-heptane after treatment with activated charcoal. A white powder having a melting point of 128–130° C. was obtained.

The structure of the product, 2-benzoylthiobenzothiazole

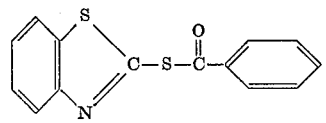

was confirmed by infrared analysis.

200 parts of ε-caprolactam and 1.4 parts of lithium hydride were reacted at 160° C. as in Example 1, and 1.45 parts of 2-benzoylthiobenzothiazole as prepared above were added. The mixture became viscous after three minutes and solidified after eight minutes. The polymer was heated at 160° C. for an additional twenty-two minutes.

The off-white, hard, tough polymer had a reduced viscosity of 6.1.

EXAMPLE 3

167 parts of 2-mercaptobenzothiazole and 150 parts of n-butylchloroformate were added to 1000 parts by volume of xylene. The solution was heated at reflux for three hours. The solution was distilled under reduced pressure to remove the solvent. The dark brown liquid residue was taken up in 500 parts of n-heptane and redistilled. A yellow product was obtained which distilled at 200–250° C. at 0.5 mm. of mercury pressure. It solidified in an ice bath and was recrystallized from n-heptane in an ice bath. The product had a melting point of 38–41° C.

The structure of the product, 2-(n-butyloxycarbonylthio)-benzothiazole

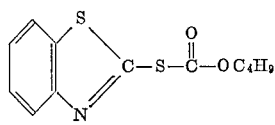

was confirmed by infrared analysis.

200 parts of ε-caprolactam and 1.4 parts of lithium hydride were reacted at 160° C. as in Example 1. 1.4 parts by volume of 2 - (n - butyloxycarbonylthio)benzothiazole were added. The mixture became viscous after four minutes and solidified after nine minutes. The polymer was heated at 160° C. for an additional twenty-seven minutes. The resultant light yellow, tough polymer had a reduced viscosity of 7.8.

It will be apparent that many modifications and variations can be effected without departing from the novel concepts of the present invention and the illustrative details disclosed therein are not to be construed as imposing undue limitations on the invention.

We claim:

1. In a process for the polymerization of a lactam under anionic conditions wherein a lactam salt of a metal of the group consisting of alkali and alkaline earth metals is a catalyst and wherein the reaction mixture is maintained at a temperature from the melting point of the lactam to the softening point of the resultant polyamide, said lactam having from 6 to 12 carbon atoms in the lactam ring the improvement which comprises adding to the reaction mixture as cocatalyst a compound of the formula

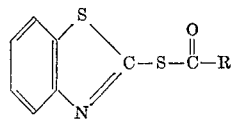

wherein R is alkoxy or phenyl.

2. A process according to claim 1 wherein the catalyst to cocatalyst mol ratio is from about 1:0.1 to about 1:10.

3. A process according to claim 2 wherein the lactam to cocatalyst mol ratio is from about 100:0.05 to about 100:1.5.

4. A process according to claim 2 wherein the lactam is ε-caprolactam.

5. A process according to claim 3 wherein the lactam is ε-caprolactam.

6. A process according to claim 5 wherein the cocatalyst is 2-(ethyloxycarbonylthio)benzothiazole.

7. A process according to claim 5 wherein the cocatalyst is 2-benzoylthiobenzothiazole.

8. A process according to claim 5 wherein the cocatalyst is 2-(n-butyloxycarbonylthio)benzothiazole.

9. A process according to claim 1 wherein the reaction mixture is maintained at a temperature from about 150° C. to about 180° C.

References Cited

UNITED STATES PATENTS 3,350,364   10/1967   Reimschuessel et al. ___ 260—78

HAROLD D. ANDERSON, Primary Examiner

PO-1050
(5/69)

UNITED STATES PATENT OFFICE
CERTIFICATE OF CORRECTION

Patent No. 3,488,325          Dated January 6, 1970

Inventor(s) Edward W. Pietrusza and Jack R. Pedersen

It is certified that error appears in the above-identified patent and that said Letters Patent are hereby corrected as shown below:

Column 4, line 33, "5.10" should be --51.0--.

Claim 9, column 6, line 29, "1" should be --5--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents